United States Patent [19]

Roschger et al.

[11] Patent Number: 5,530,130
[45] Date of Patent: Jun. 25, 1996

[54] PHTHALOPERINONE DYESTUFFS

[75] Inventors: Peter Roschger; Volker Hederich, both of Köln; Stephan Michaelis, Leverkusen, all of Germany

[73] Assignee: Bayer Aktiengesellschaft, Leverkusen, Germany

[21] Appl. No.: 289,817

[22] Filed: Aug. 12, 1994

[30]  Foreign Application Priority Data

Aug. 19, 1993 [DE] Germany ............................ 43 27 855.8
Nov. 22, 1993 [DE] Germany ............................ 43 39 699.2

[51] Int. Cl.⁶ ......................... C07D 487/06; C09B 57/12
[52] U.S. Cl. ................... 544/245; 8/657; 8/920; 8/922; 8/924; 8/925; 8/928; 524/90
[58] Field of Search ............................................... 544/245

[56]  References Cited

U.S. PATENT DOCUMENTS

| | | | |
|---|---|---|---|
| 3,909,442 | 9/1975 | Tucker et al. ............................ | 544/245 |
| 4,024,144 | 5/1977 | Groll et al. .............................. | 544/245 |
| 4,417,014 | 11/1983 | Buecheler ................................ | 544/245 |
| 4,866,113 | 9/1989 | Bitterli et al. ............................ | 524/87 |
| 5,466,805 | 11/1995 | Roschger ................................. | 544/245 |

FOREIGN PATENT DOCUMENTS

| | | |
|---|---|---|
| 0241419 | 10/1987 | European Pat. Off. . |
| 2272152 | 12/1975 | France . |
| 2236555 | 2/1974 | Germany . |
| 799352 | 8/1958 | United Kingdom ................... 544/245 |
| 1095035 | 12/1967 | United Kingdom ................... 544/245 |

*Primary Examiner*—Emily Bernhardt
*Attorney, Agent, or Firm*—Sprung Horn Kramer & Woods

[57]  ABSTRACT

Phthaloperinone dyestuffs of the general formula (I)

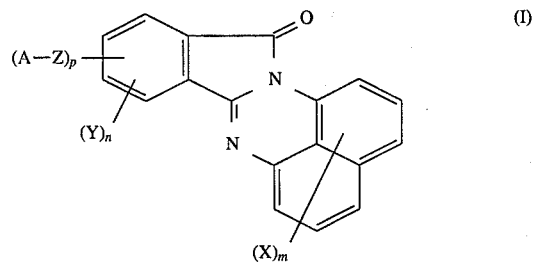

wherein
  Z denotes $SO_2$ or CO,
  A represents optionally substituted alkyl or aryl,
  and the other substituents have the meanings given in the description, are prepared by condensation of corresponding phthalic acids or functional derivatives thereof and optionally substituted 1,8-naphthalene-diamines.

The dyestuffs according to the invention have very good fastnesses and are employed in processes for bulk dyeing plastics.

5 Claims, No Drawings

PHTHALOPERINONE DYESTUFFS

The invention relates to perinone dyestuffs, a process for their preparation and their use for bulk dyeing plastics.

Acyloxyphthaloperinones are described in DE-A-22 36 555, but these still have certain disadvantages. Phthaloperinone dyestuffs of the general formula (I)

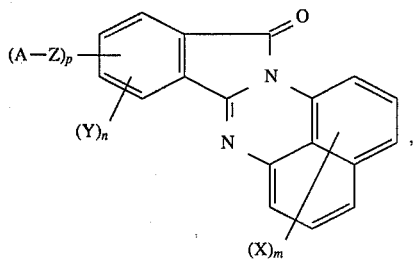

wherein

Z denotes $SO_2$ or CO,

A represents optionally substituted alkyl or aryl,

X represents $C_1$–$C_6$alkyl, halogen, $C_1$–$C_6$-alkoxy or $C_1$–$C_7$-acyloxy or represents a fused-on cycloaliphatic ring, Y represents $C_1$–$C_6$-alkyl, $C_6$–$C_{10}$-aryl, halogen, $C_1$–$C_6$-alkoxy, $C_1$–$C_7$-acyloxy or an amino group which is optionally substituted by $C_1$–$C_7$-acyl or $C_1$–$C_6$-alkyl, m denotes a number from 0 to 6, n denotes a number from 0 to 3, and p denotes 1 or 2, n+p represents a number from I to 4 and for m>1, X can in each case have different or the same abovementioned meanings, and for n>1, Y can in each case have different or the same abovementioned meanings, have now been found.

Particularly preferred phthaloperinones are those wherein A represents $C_1$–$C_{18}$-alkyl, which is optionally unsaturated and/or can carry further substituents, such as, for example, halogen, such as Cl, F or Br, $C_1$–$C_4$-alkoxy, phenoxy or phenyl which is optionally substituted by halogen, $C_1$–$C_4$-alkyl or $C_1$–$C_4$-alkoxy, or represents phenyl or naphthyl, which can optionally be substituted by halogen, $C_1$–$C_4$-alkyl, cyano, $C_1$–$C_4$-alkyl-mercapto, $C_1$–$C_4$-alkylcarbonylamino, phenyl, phenoxy or $C_1$–$C_4$-alkoxy, and X represents chlorine, bromine, fluorine, $OCH_3$, $OC_2H_5$, $OCH_2$ ($C_6H_5$), $OC_3H_7$, methyl, ethyl, n-propyl, isopropyl, n-butyl, isobutyl, sec-butyl, tert-butyl or a cycloaliphatic 5- or 6-membered ring which is preferably fused on in the peri-position, that is to say in each case in the para-position to the N atoms, wherein —$C_6H_5$ here and also below represents phenyl, Y represents fluorine, chlorine, bromine, $OCH_3$, $NHCOCH_3$, $N(C_2H_5)_2$, methyl, ethyl, n-propyl, isopropyl, n-butyl, isobutyl, sec-butyl, tert-butyl or an optionally substituted phenyl, m ,denotes a number from 0 to 4, n denotes a number from 0 to 2, p denotes 1 or 2 and n+p denotes a number from 1 to 3.

In a special embodiment,

X denotes chlorine, bromine, methyl, ethyl or a cycloaliphatic 5- or 6-membered ring fused on in the peri-(4,5)-position.

m denotes a number from 0 to 2, n denotes the number 0 and p denotes 1 or 2, and A and Z have the abovementioned meaning.

In an especially preferred embodiment, m represents 0.

In another especially preferred embodiment, p represents 1.

The alkylcarbonyls formed from A and Z together are, for example:

acetyl, propionyl, butyryl, 1-methylbutyryl, 2-butyl-butyryl, 1-ethylbutyryl, dimethylpropionyl, pentanoyl, hexanoyl, 1-ethylhexanoyl, heptanoyl, octanoyl, nonanoyl, decanoyl, dodecanoyl, tetradecanonyl, hexadecanoyl, octadecanoyl, ethoxyacetyl, cyclohexylcarbonyl, 4-methyl-cyclohexylcarbonyl, 3,5-dimethylcyclohexylcarbonyl, phenylacetyl, β-phenylpropionyl, 4-methylphenylacetyl, phenoxyacetyl, 4-chlorophenoxyacetyl and cinnamoyl.

The arylcarbonyl radicals formed from A and Z together are, for example:

benzoyl, 2-, 3-and 4-chlorobenzoyl, 2-, 3-and 4-methylbenzoyl, 4-methoxybenzoyl, 4-ethoxybenzoyl, 2,3-dichlorobenzoyl, 3,5 -dimethylbenzoyl, 4-phenylbenzoyl, 1-naphthoyl, 2-naphthoyl and 2-methoxy-1-naphthoyl.

The alkylsulphonyl radicals formed from A and Z together are, for example:

methanesulphonyl, ethanesulphonyl, n-propanesulphonyl, n-butanesulphonyl, n-octanesulphonyl, n-dodecanesulphonyl, n-hexadecanesulphonyl, β-methoxyethanesulphonyl, β-ethoxyethanesulphonyl, cyclohexanesulphonyl and 4-methylcyclohexanesulphonyl.

The arylsulphonyl radicals formed from A and Z together are, for example:

benzenesulphonyl, 4-methylbenzenesulphonyl, 4-methoxybenzenesulphonyl, 4-isopropylbenzenesulphonyl, 2- or 4-chlorobenzenesulphonyl, 2,4-dichlorobenzenesulphonyl, 4-methylmercaptobenzenesulphonyl, 4-acetaminobenzenesulphonyl, 1-naphthalenesulphonyl and 2-naphthalenesulphonyl.

Particularly preferred dyestuffs are those in which A and Z together represent benzoyl or benzenesulphonyl.

The embodiment of the dyestuffs according to the invention which is to be especially singled out corresponds to the formulae (IIa), (IIb), (IIIa) and (IIIb)

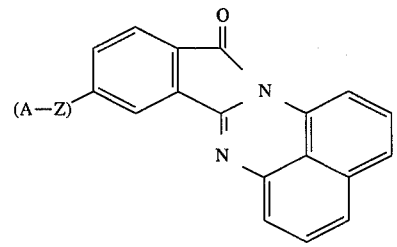

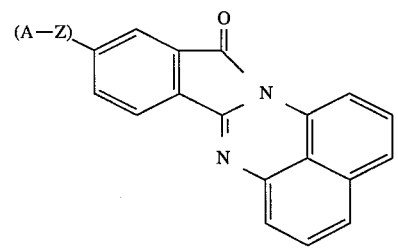

-continued

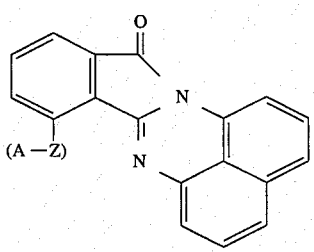
(IIIa)

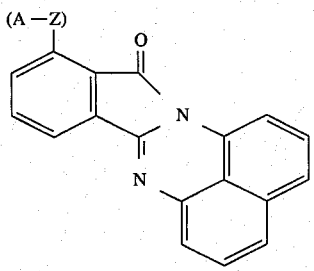
(IIIb)

or mixtures thereof of any desired composition, mixtures of any desired composition of the isomers (IIa) and (IIb) or (IIIa) and (IIIb) being mentioned as preferred.

The invention also relates to a process for the preparation of the dyestuffs of the formula (I) according to the invention by condensation of phthalic acids of the formula (IV) or functional derivatives thereof, preferably the anhydrides,

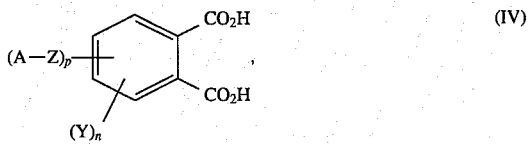
(IV)

in which

A, Z, Y, n and p have the meaning given, with naphthalene-1,8-diamines of the formula (V)

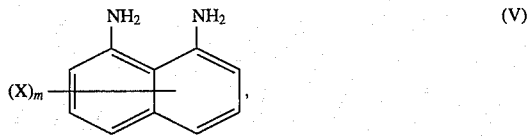
(V)

in which

X and m have the meaning given, in a molar ratio of 1:0.8 to 1:1.2, preferably in equimolar amounts, at a temperature of 50°–220° C., if appropriate in the presence of a catalyst, if appropriate under pressure and if appropriate in the presence of a solvent.

The condensation can accordingly be carried out in the melt or, more advantageously, in a solvent.

The process in the melt is preferably carried out at a temperature of 120°–180° C., and the process in a solvent is preferably carried out at 80°–150° C.

The water of reaction is preferably removed from the reaction mixture by distillation.

The product is preferably isolated by filtration, it being possible for a solvent having a precipitating action to be added to the reaction mixture beforehand.

Thus, for example, isomer mixtures of dyestuffs of the formulae (IIa) and (IIb) are formed from 1,8-diaminonaphthalene and phthalic acids which are substituted by A–Z in the 4-position, and isomer mixtures of compounds of the formulae (IIIa) and (IIIb) are formed from the amine mentioned and phthalic acids substituted by A–Z in the 3-position. However, if the phthalic acid substituted by A which is employed is itself in the form of a mixture of the 3- and 4-isomers, mixtures of the isomeric dyestuffs of the formulae (IIa), (IIb), (IIIa) and (IIIb) are obtained.

Suitable solvents for the reaction are, for example: chlorobenzene, o-dichlorobenzene, trichlorobenzene, xylene, dimethylformamide, N-methylpyrrolidone, glacial acetic acid, propionic acid, phenol, cresols, phenoxyethanol, glycols and mono- and dialkyl ethers thereof, alcohols, for example methanol, ethanol and i-propanol, water and aqueous solvents, such as, for example, dilute sulphuric acid and the like.

If appropriate, the reaction can be carried out with the addition of an acid catalyst.

Suitable catalysts are, for example: zinc chloride, p-toluenesulphonic acid, hydrochloric acid, sulphuric acid and organic acids, such as, for example, glacial acetic acid or benzoic acid and the like.

If catalysts are used, up to 0.1 molar equivalent, based on the component of the formula (IV), is preferably employed.

Similar processes are already known from D.R.P. 202 354, Chem. Ber. 75 (1942), 719, and Liebigs Ann. Chem. 365 (1909), 128.

The corresponding phthalic acids (and functional derivatives thereof) can be prepared, for example, as in U.S. Pat. No. 5,061,810; U.S. Pat. No. 1,155,588; EP 245 729; Zh. Prikl. Khim. 49, 1353–8 (1976); Zh. Org. Khim. 14, 1046–51 (1978); ibid. 9, 121–8 (1973); and DE 2 243 283 or analogously thereto.

The process variant which is of particular interest because of the reaction conditions which are easy to implement industrially is therefore that which is characterized in that acid chlorides of the formula (VI)

A-Z-Cl        (VI)

are reacted with o-dialkylbenzenes of the formula (VII)

(VII)

in the presence of acid catalysts in the sense of a Friedel Crafts acylation to give compounds of the formula (VIII)

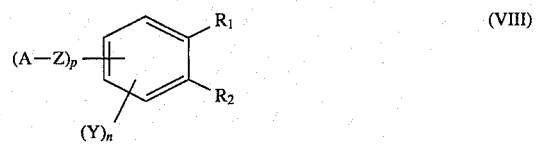
(VIII)

and these are oxidized to phthalic acids of the formula (IV) in a second step. Instead of acid chlorides of the formula (VI) in which Z is CO, the corresponding benzotrichlorides A-CCl$_3$ can also be used.

A process which has not been previously described and to which the invention therefore likewise relates is the above-mentioned process in which

Z=SO$_2$,

A=phenyl, which is optionally substituted by up to two chlorine atoms or one bromine atom, or 1- or 2-naphthyl, P=1 or 2, preferably 1, n=0 and R$_1$ and R$_2$ independently of one another represent C$_1$–C$_4$-alkyl, preferably methyl, or together represent a tri- or tetramethylene radical.

Acid catalysts which are used are preferably iron(III) chloride or aluminium chloride. Other suitable catalysts are tin(IV) chloride, titanium(IV) chloride, aluminium bromide, zinc chloride, iron and the like.

The catalyst is employed in amounts of 0.0001 to 1.1 mol per mole of sulphochloride of the formula (VI), preferably 0.0005 to 0.01 mol.

The molar ratio of the compounds of the formula (VI) and (VII) can be, for compounds of the formula (VIII) where p=1, from 1.5:1 to 1:100, preferably 0.9:1 to 1:0.9, and for p=2, from 1.5:1 to 3:1, preferably from 2:1 to 2.5:1. The component employed in excess can itself function as the solvent, but similarly an inert solvent, such as nitrobenzene, o-dichlorobenzene, 1,2-dichloroethane and the like, can additionally be added. The reaction is preferably carried out in the melt without a solvent.

The reaction temperature is 0° to 180° C. for p=1 and 80° to 200° C. for p=2.

Excesses of o-dialkylbenzene (VII) or solvent are removed by distillation, if appropriate in vacuo or with the aid of steam. The resulting product is preferably used directly without further purification.

The oxidation is carried out by methods known per se for dialkylaromatics. A preferred oxidizing agent is nitric acid. Oxygen, air, (di)chromates, chromic acid, permanganates, manganese dioxide, hypochlorites and the like are also suitable.

If nitric acid is used, the concentration of which can be 5 to 50%, the reaction is preferably carried out under pressure at temperatures of 120° to 180° C. The nitric acid can be regenerated with air or oxygen, which can be of advantage in the case of low nitric acid concentrations, and the procedure as a circulatory process can likewise be favourable.

Suitable starting materials of the formula (IV) are, for example:

4-(benzenesulphonyl) phthalic acid, 3-(benzenesulphonyl)-phthalic acid, 4-(4'-methylbenzenesulphonyl) phthalic acid, 3-(3'-methylbenzenesulphonyl) phthalic acid, 4-(2'-methylbenzenesulphonyl) phthalic acid, 4-(4'-tert-butylbenzenesulphonyl) phthalic acid, 4-(2', 4'-dimethylbenzenesulphonyl) phthalic acid, 4-(4'-chlorobenzenesulphonyl) phthalic acid, 4- (3'-chlorobenzenesulphonyl) phthalic acid, 3-(2'-chlorobenzenesulphonyl) phthalic acid, 4-(4'-fluorobenzenesulphonyl) phthalic acid, 4-(4'-bromobenzenesulphonyl) phthalic acid, 4-(3',4'-dichlorobenzenesulphonyl)phthalic acid, 4-(4'-methoxybenzenesulphonyl) phthalic acid, 3-(4'-methoxybenzenesulphonyl) phthalic acid, 4-(3'-methoxybenzenesulphonyl) phthalic acid, 4-(4'-ethoxybenzenesulphonyl) phthalic acid, 4-(3'-butoxybenzenesulphonyl) phthalic acid, 4-(methanesulphonyl) phthalic acid, 3-(methanesulphonyl) phthalic acid, 4-(ethanesulphonyl) phthalic acid, 4-(n-butanesulphonyl) phthalic acid or 4-(cyclohexanesulphonyl)phthalic acid, 4-(acetyl) phthalic acid, 4-(propionyl) phthalic acid, 4-(butyryl) phthalic acid, 4-(cyclohexanecarbonyl) phthalic acid, 4-(benzoyl) phthalic acid, 3-(benzoyl) phthalic acid, 4-(methylbenzoyl) phthalic acid, 4-(ethylbenzoyl) phthalic acid, 3-(chlorobenzoyl)phthalic acid, 4-(chlorobenzoyl) phthalic acid, 4-(dichlorobenzoyl) phthalic acid, 4-(dimethylbenzoyl)phthalic acid, 4-(tert-butylbenzoyl) phthalic acid, 4-(fluorobenzoyl)phthalic acid, 4-(acetylaminobenzoyl) phthalic acid, 4-(methylmercaptobenzoyl) phthalic acid, 4-(methanesulphonylbenzoyl)phthalic acid, 4-(methoxybenzoyl)phthalic acid, 4-(ethoxybenzoyl) phthalic acid and 4-(butoxybenzoyl) phthalic acid or anhydrides thereof.

The substituted naphthalene-1,8-diamines employed can be prepared, for example, according to D.R.P. 122 475; D.R.P. 108 166; J. Chem. Soc. (1932) 2310; ibid. (1936), 556, 1338; ibid. (1945), 454, 543; ibid. (1951) 221; J. prakt. Chem. 94 (1916), 45; Cornpt. red. 224 (1947), 1569; An. Soc. espan. 31 (1933), 861, 876; J. Org. Chem. 24 (1959), 214 and the like or analogously thereto.

Suitable naphthalene-1,8-diamines of the formula (V) are:

1,8-naphthalenediamine, chloro-1,8-naphthalenediamines, dichloro-1,8-naphthalenediamines, bromo-1,8-naphthalenediamines, methyl-1,8-naphthalenediamines, dimethyl-1,8-naphthalenediamines, methylchloro-1,8-naphthalenediamines, methoxy-1,8-naphthalenediamines, ethoxy-1,8-naphthalenediamines, acetamino-1,8-naphthalenediamines and 4,5-dimethylenenaphthalene-1,8-diamine, the substituents preferably being bonded in the 2-, 4-, 5- or 7-position of the naphthalene.

The invention furthermore relates to a process for the preparation of compounds of the general formula (IX)

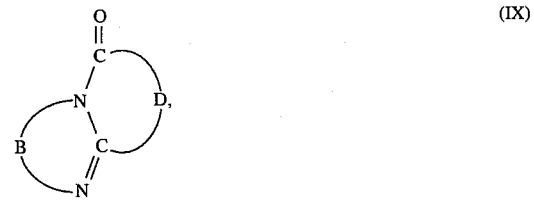

under which the dyestuffs of the formula (I) according to the invention also fall, which is characterized in that aromatic dicarboxylic acids of the formula (X)

or anhydrides or esters thereof are reacted with aromatic diamines of the formula (XI)

in a phenolic solvent, wherein:

D denotes optionally substituted ortho-phenylene, 2,3-naphthylene, peri (1,8)naphthylene or arylene of more than two benzene rings fused to one another and B denotes optionally substituted ortho-phenylene, ortho-naphthylene, peri (1, 8) naphthylene or arylene of more than two benzene rings fused to one another, and wherein the arylene radicals D and B in formula (IX) which contain more than two benzene rings fused to one another are bridged in the ortho-position or correspondingly a peri-position in the naphthalene.

The peri-position actually corresponds to the 1,8-position in the naphthalene. However, both in the literature and in the context of the present Application, this meaning is also extended to arylenes which contain more than two benzene rings fused to one another.

In a preferred embodiment of the process:

D denotes optionally substituted ortho-phenylene, 2,3-naphthylene or peri(1,8)-naphthylene and B denotes optionally substituted ortho-phenylene, ortho-naphthylene, peri(1,8)-naphthylene or periacenaphthylene.

The compounds of the formula (IX) to be prepared according to the invention are yellow to red dyestuffs which are employed for dyeing synthetic fibers of, for example, polyester materials, but in particular for bulk dyeing plastics. It is known to prepare these dyestuffs by fusing together compounds of the formula (X) and (XI) (F. Sachs. A. 365 (1909), 53 to 166) or by condensation in inert higher-boiling solvents, such as chlorinated aromatic hydrocarbons (DE-A-2 424 542) or in nitrobenzene (BE-A-600 302), glacial acetic acid (DE-A-2 236 555), dimethylformamide (DE-2 157 547) or N-methylpyrrolidone (CH-A-561 763). In contrast, the process according to the invention relates to the use of a phenolic solvent, preferably of phenol which is optionally substituted by alkyl groups having 1 to 16 C atoms and/or by chlorine, for condensation of diaminoaromatics of the formula (XI) and aromatic dicarboxylic acids of the formula (X) or anhydrides or esters thereof.

In contrast to the prior art, the process according to the invention allows the preparation of particularly pure dyestuffs of the formula (IX) and a problem-free recovery of the solvent employed, the nature and number of alkyl groups occurring in the phenolic solvent and where appropriate the presence of chlorine not being essential.

Preferred suitable solvents are, for example, phenol, ortho-, meta- or para-cresol, dimethylphenols, p-tert-butylphenol, nonylphenol or chlorophenol or mixtures thereof. Phenol is the particularly preferred solvent.

The amount of solvent can be varied widely, and can be, for example, the same to 10 times the amount by weight of the dyestuff of the formula (IX) obtainable from the starting materials (X) and (XI), but preferably 2 to 5 times the amount by weight.

In the condensation of the compounds (X) and (XI), it is not necessary to employ one of the two in excess, but on the other hand an excess causes no trouble, since it can be removed with the solvent. The starting compounds of the formulae (X) and (XI) and the functional derivatives of (X) in the form of dicarboxylic acid anhydrides or esters are known or obtainable by known methods.

Possible substituents for the aromatic dicarboxylic acids of the formula (X) and diamines of the formula (XI) are, for example, the definitions given above under Y, X and —(Z-A), as well as nitro, aryl, aryloxysulphonyl, hydroxyl, alkyloxy, aryloxy, an aminosulphonyl which is optionally substituted by alkyl or aryl, or a fused-on heterocyclic ring.

Preferred substituents are: chlorine, fluorine, bromine, nitro, methoxy, $NH_2$, benzyloxy, hydroxyl, $—SO_2O(C_6H_5)$, $—SO_2N(CH_3)_2$, $—SO_2NHCH_3$, methyl, ethyl, n-propyl, iso-propyl, n-, sec-, tert-butyl, $NHCOCH_3$, $—N(C_2H_5)_2$, optionally substituted phenyl, benzoyl or benzenesulphonyl.

Preferred aromatic dicarboxylic acids of the formula (X) are:

phthalic acid, 3-, or 4-chlorophthalic acid, dichlorophthalic acids, trichlorophthalic acids, tetrachlorophthalic acid, tetrabromophthalic acid, 3-methylphthalic acid, 3,5-dimethylphthalic acid, 4-methylphthalic acid, 4-phenoxyphthalic acid, 3-hydroxyphthalic acid, 4-phenylphthalic acid, 4-phenylsulphonylphthalic acid, 3-phenylsulphonylphthalic acid, 4-benzoylphthalic acid, 3-benzoylphthalic acid, 4-nitrophthalic acid, 4-acetaminophthalic acid, 3-benzoylaminophthalic acid, 4-aminosulphonylphthalic acid, 4-phenoxysulphonylphthalic acid, 3-acetoxyphthalic acid, trimellitic acid, naphthalene-2,3-dicarboxylic acid, naphthalene-1,8-dicarboxylic acid, 4-chloronaphthalene-1,8-dicarboxylic acid, 4-phenylmercaptonaphthalene-1,8-dicarboxylic acid, 4,5-ethylenenaphthalene-1,8-dicarboxylic acid and anthracene-1,2-dicarboxylic acid.

Preferred aromatic diamines of the formula (XI) are:

o-phenylenediamine, chloro-o-phenylenediamines, dichloro-o-phenylenediamines, methyl-o-phenylenediamines, ethyl-o-phenylenediamines, methoxy-o-phenylenediamines, acetamino-o-phenylenediamines, phenyl-o-phenylenediamines, and naphthylene-o-diamines, and furthermore 1,8-naphthylenediamine, chloro-1,8-naphthylenediamines, dichloro-1,8-naphthylenediamines, methyl-1,8-naphthylene dieunines, dimethyl-1,8-naphthylenediamines, methoxy-1,8-naphthylenediamines, ethoxy-1,8-naphthylenediamines, acetamino-1,8-naphthylenediamines and 1,8-diaminoacenaphthalene.

In another preferred process variant, an optionally substituted peri-naphthylenediamine is employed as a compound of the formula (XI), in particular 1,8-naphthylenediamine.

The process according to the invention is in general carried out by introducing the phenolic solvent into the reaction vessel in the liquid format room temperature or in molten form at a temperature of 60° to 150° C., preferably 60° to 120° C., preferably under an inert gas atmosphere, in particular under nitrogen, and introducing the components of the formulae (X) and (XI) in any desired sequence or simultaneously. The amount of phenolic solvent essentially depends on the solubility of the reaction products, and is the same to 10 times the amount by weight, based on the compound of the formula (IX) to be expected, but preferably 2 to 5 times the amount by weight. However, the amount of solvent can also be less than the same amount by weight of the compound of the formula (IX) to be expected. The introduction of the reaction components of the formulae (X) and (XI) can be carried out with utilization of the heat of reaction or at the particular introduction temperature with cooling, depending on the starting temperatures, the mixture subsequently being increased to the reaction temperature, during which the water of reaction can be distilled off. The reaction is in general carried out at a reaction temperature of 80° to 200° C., preferably at 100° to 150° C., it being possible for the condensation to be effected both under normal pressure and under a pressure of 1 to 10 bar, preferably 1 to 5 bar.

The formation of the reaction product of the formula (IX) is in many cases ended after the reaction temperature has been reached. The reaction times are usually 1 to 10 hours. If the anhydrides of the dicarboxylic acids of the formula (X) are used, they are about 1 to 3 hours. The dicarboxylic acids can be converted into their anhydrides beforehand by heating to temperatures of, for example, 100° to 200° C., and they can also be employed in the water-moist form, it being possible for them to be dehydrated by distillation before or during the condensation.

If appropriate, the reaction to give the compounds of the formula (IX) can be carried out in the presence of acid catalysts, possible catalysts being, in addition to inorganic acids, such as, for example, boric acid, in particular organic acids, such as acetic acid, propionic acid or especially benzoic acid. These can be employed in amounts of 0.01 to 1 mol per mole of the compound of the formula (IX) to be expected. In one process variant, the starting substances of the formulae (X) and (XI) can be subjected to a preliminary condensation in a low-boiling solvent, such as, for example, methanol or ethanol, for removal of 1 mol of water per mole of starting substances of the formulae (X) and (XI), after which the mixture is heated to the reaction temperature, with addition of the phenolic solvent and removal of the low-boiling solvent by distillation, and the condensation to give (IX) is brought to completion. In this case, the low-boiling solvent is added in an amount of 1 to 5, preferably 2 to 3 parts by weight per part by weight of the compound of the formula (IX) to be expected, and the first condensation stage is carried out at 20° to 100° C., preferably at 50° to 70° C.

When the condensation has ended, the compounds of the formula (IX) formed can be isolated directly by filtration at elevated temperature, but preferably at ambient temperature, and then washed with cold or hot water or with organic solvents. Possible organic solvents here are, in particular, lower alcohols, such as methanol, ethanol or isopropanol, and furthermore aliphatic, cycloaliphatic or aromatic hydrocarbons, such as, for example, hexane, cyclohexane or toluene, and furthermore aprotic solvents, such as formamide, dimethylformamide or sulpholane, and other solvents, such as glacial acetic acid or acetonitrile.

Preferably, however, the reaction products are precipitated with water or with water-miscible solvents (precipitating agents), such as methanol or ethanol, at temperatures below 120° C., preferably in ranges from 100° to 60° C., under normal pressure or under a pressure of 1 to 15 bar. The products are then isolated by filtration at temperatures between 0° and 80° C., preferably at 20° to 50° C., washed with the same solvent used for the precipitation and/or a mixture of the solvents described and, if water-miscible solvents are used, then with water and dried, or employed as the water-containing press-cake for finishing.

If appropriate, the phenolic solvents used according to the invention are recovered by distillation, if appropriate under reduced pressure, after removal of the precipitating agents used. The dyestuffs of the formula (IX) obtained by the process according to the invention are distinguished by a high purity with simultaneously good to very good yields.

The dyestuffs prepared by the process according to the invention are employed for dyeing synthetic hydrophobic fiber materials, such as cellulose triacetate, polyethyleneterephthalate or polyamides, by known dyeing processes, but in particular for spin and bulk dyeing of thermoplastics, such as polystyrene, polyester and polycarbonate, and of copolymers, such as acrylonitrile/butadiene/styrene, styrene/acrylonitrile and the like.

The dyestuffs of the formula (I) according to the invention are outstandingly suitable for bulk dyeing plastics.

Bulk dyeing here is understood as meaning, in particular, processes in which the dyestuff is incorporated into the molten plastics composition, for example with the aid of an extruder, or in which the dyestuff is already added to starting components for preparation of the plastic, for example to monomers before the polymerization.

Particularly preferred plastics are thermoplastics, for example: vinyl polymers, polyesters and polyamides.

Suitable vinyl polymers are polystyrene, styrene/acrylonitrile copolymers, styrene/butadiene copolymers, styrene/butadiene/acrylonitrile terpolymers, polymethacrylates and the like.

Polyesters which are furthermore suitable are: polyethyleneterephthalates, polybutyleneterephthalates, polycarbonates and cellulose esters.

Polystyrene, styrene copolymers, polycarbonates and polymethacrylate are preferred. Polystyrene is particularly preferred.

The high molecular weight compounds mentioned can be present individually or as mixtures, as plastic compositions or melts.

The dyestuffs according to the invention are used in finely divided form, it being possible, but not essential, for dispersing agents to be co-used.

If the dyestuffs (I) are employed after the polymerization, they are mixed or ground with the granules of plastic in the dry state, and this mixture is plasticized and homogenized, for example on roll mills or in extruders. However, the dyestuffs can also be added to the molten composition and distributed homogeneously by stirring. The material predyed in this way is then further processed in the customary manner, for example to bristles, filaments and the like by spinning or to mouldings by extrusion or in the injection moulding process.

Since the dyestuffs of the formula (I) are resistant to polymerization catalysts, in particular peroxides, it is also possible to add the dyestuffs to the monomeric starting materials for the plastics and then to polymerize these materials in the presence of polymerization catalysts. For this, the dyestuffs are preferably dissolved in the monomeric components or mixed intimately with them.

The dyestuffs of the formula (I) are preferably employed for dyeing the polymers mentioned in amounts of 0.0001 to 1% by weight, in particular 0.01 to 0.5% by weight, based on the amount of polymer.

By addition of pigments which are insoluble in the polymers, such as, for example, titanium dioxide, corresponding valuable opaque dyeings can be obtained.

Titanium dioxide can be used in an amount of 0.01 to 10% by weight, preferably 0.1 to 5% by weight, based on the amount of polymer.

Transparent or opaque brilliant orange to violet dyeings having a good heat resistance and good fastness to light and weathering are obtained by the dyeing process according to the invention.

Mixtures of different dyestuffs of the formula (I) and/or mixtures of dyestuffs of the formula (I) with other dyestuffs and/or inorganic or organic pigments can also be employed in the dyeing process according to the invention.

The invention is explained by but not limited to the following examples, in which the parts are stated in terms of weight and percentage data denote percentages by weight (wt. %).

EXAMPLE 1

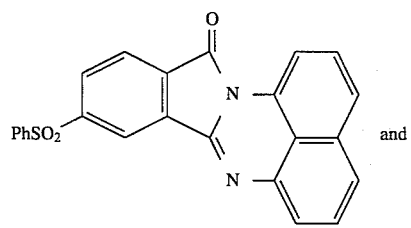 and

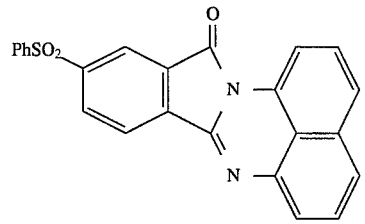

A) Preparation

A mixture of 3.1 parts of naphthalene-1,8-diamine, 5.7 parts of 4-benzenesulphonylphthalic acid anhydride and 30 parts of glacial acetic acid is heated at 80° C. for 10 minutes. After cooling, the resulting precipitate is filtered off with suction and washed with methanol and water. Yield: 7.7 parts (95%) of an isomer mixture of the two dyestuffs of the above formulae.

The 4-benzenesulphonylphthalic acid anhydride can be prepared as follows:

4-Benzenesulphonyl-1,2,-dimethylbenzene 110 g of o-xylene, 176 g of benzenesulphonyl chloride and 0.16 g of iron(III) chloride are brought together at room temperature and the mixture is heated at 110° C. in the course of 2 hours. When the evolution of HCl has ended, the mixture is heated to 140° C. and the product is discharged onto a metal sheet. On cooling, the melt solidifies to a colourless mass. Yield: 243 g.

4-Benzenesulhphonylphthalic acid 20 g of the above product are suspended in 600 ml of water and 200 ml of 65% strength nitric acid. The suspension is then heated at 160° C. in an autoclave for 6 hours, during which a pressure of 10 to 13 atmospheres is established. After the autoclave has been let down, the mixture is cooled to about 0°–5° C. and, after some hours, the precipitate is filtered off with suction. It is washed with a little ice-water and dried. Yield: 18–22 g.

4-Benzenesulphonylphthalic acid anhydride 19 g of the free acid are heated at the boiling point in 100 ml of acetic anhydride for 10 minutes. The mixture is then cooled to 5° C. and, after some hours, the precipitate is filtered off with suction. Yield: 16 g.

B) Dyeing examples

Example a)

100 parts of polystyrene granules and 0.02 part of the dyestuff from Example A) are mixed intensively in a drum mixer for 15 minutes. The granules which have been dyed in the dry state are processed at 240° C. on a screw injection moulding machine. Transparent red sheets of very good fastness to Light are obtained. Instead of the polystyrene polymer, it is also possible to use copolymers with butadiene and acrylonitrile. If 0.5 part of titanium dioxide is additionally added, deep opaque dyeings are obtained.

Example b)

0.015 part of the dyestuff from Example A) and 100 parts of polymethyl methacrylate are mixed in the dry state and homogenized on a 1-screw extruder at 230° C. The material emerging from the extruder as the extrudate is granulated. It can then be pressed to shapes. A transparently red-dyed plastic with good fastness to light and weather is obtained.

Example c)

100 parts of a commercially available polycarbonate are mixed in the dry state in the form of granules with 0.03 part of the dyestuff from Example A). The granules dusted in this way are homogenized on a 2-screw extruder at 290° C. A transparent red dyeing of good fastness to light is obtained. The dyed polycarbonate is discharged from the extruder as the extrudate and processed to granules. The granules can be processed by the customary methods of fabrication of thermoplastic compositions.

If the procedure is as described above, but with addition of 1% of titanium dioxide, a red opaque dyeing is obtained.

Example d)

0.04 part of the dyestuff from Example A) is mixed in the dry state with 100 parts of styrene/acrylonitrile copolymer, the mixture is homogenized in a 2-screw extruder at 190° C., granulated and then pressed to shapes in the customary manner. A transparently red plastic of good fastness to light is obtained.

Example e)

0.025 part of the dyestuff from Example A) are mixed with 100 parts of polyethyleneterephthalate of a transparent type and the mixture is homogenized in a 2-screw extruder at 280° C. A transparent red dyeing with good fastness to light is obtained. After subsequent granulation, the dyed plastic can be processed by the customary methods of thermoplastic shaping. If the procedure is carried out with the addition of 1% of titanium dioxide, an opaque dyeing is obtained.

Example f)

0.05 part of tert-dodecylmercaptan and 0.05 part of the dyestuff from Example A) are dissolved in 98.9 parts of styrene. This solution is dispersed in a solution of 200 parts of desalinated water, 0.3 part of partly hydrolysed polyvinyl acetate (for example Mowiol® 50/88 from Hoechst) and 0.05 part of dodecylbenzenesulphonate. After addition of 0.1 part of dibenzoyl peroxide in 1 part of styrene, the dispersion is heated to 80° C., while stirring vigorously, and the polymerization is started. By using the following polymerization conditions: 4 hours at 80° C., 2 hours at 90° C., 3 hours at 110° C., 2 hours at 130° C., the polymer is obtained in a yield of 98% of theory. The polymer is obtained in the form of beads which have a diameter of 0.1 to 1.5 mm ($D_{50}$ value), depending on the stirring conditions. The polymer is separated from the serum by filtration and dried to a residual moisture content of 0.5% at 110° C. After melting in a mixing unit (hot roll mill), 0.5% of zinc stearate and 0.2% of Ionol® from Shell (≙2,6-di-tert-butyl-p-cresol) are admixed and the polymer is granulated.

The polymer can be processed to red, transparent mouldings by the customary methods of thermoplastic shaping, for example by the injection moulding process.

Example g)

0.2 part of tert-dodecylmercaptan and 0.01 part of the dyestuff from Example A) are dissolved in 74.8 parts of styrene and 25 parts of acrylonitrile, and this solution is then dispersed in a solution of 200 parts of completely desalinated water and 0.2 part of a copolymer, neutralized with sodium hydroxide, of styrene and maleic anhydride. After addition of 0.1 part of dibenzoyl peroxide dissolved in one part of styrene, the dispersion is heated to 80° C., while stirring vigorously, and the polymerization is started. After polymerization as in Example f), the mixture is also worked up in the same manner as described in the Example. 0.5% of zinc stearate as a lubricating agent and 0.5% of Ionol® from Shell (≙ 2,6-di-tert-butyl-p-cresol) as an anti-aging agent are incorporated on the hot roll mill. The granulated polymer can be injection moulded to transparent red mouldings.

Example h)

A solution of 99.95 parts of styrene, 0.04 part of the dyestuff from Example A) and 0.01 part of di-tert-butyl peroxide is introduced into a continuously operating preliminary reactor operated with an overflow and subjected to initial polymerization at a temperature of 75° C. The initially polymerized solution (polystyrene content 20%) emerging from the preliminary reactor is introduced into a 2-screw extruder. The two screws run in opposite directions at 20 rpm. The four heatable and coolable segments of the extruder are kept at 110° C., 130° C., 160° C., 180° C. in the sequence product intake—product discharge. The polymer leaves the extruder reactor with a solids concentration of 80%. 3 parts by weight of Ionol® from Shell ($\hat{=}$ 2,6-di-tert-butyl-p-cresol) and 5 parts by weight of octyl alcohol per 1000 parts by weight of polymer solution are metered into a downstream extruder, and the polymer is degassed and then granulated. The red-dyed granules can be processed to mouldings.

Example i)

0.02 part of the dyestuff from Example A) are dissolved in 74.97 parts of styrene and 25 parts of acrylonitrile or methacrylonitrile. After addition of 0.01 part of di-tert-butyl peroxide, the solution thus obtained is introduced into a continuously operating preliminary reactor operated with an overflow. The polymerization and working up are carried out as described in Example h). The transparent red granules can be further processed to profiles and sheets by the customary methods of processing of thermoplastic compositions.

Example k)

0.03 part of the dyestuff from Example A) is dissolved in 99.97 parts of methyl methacrylate. After addition of 0.1 part of dibenzoyl peroxide, the solution is heated to 120° C. and the polymerization is started. After 30 minutes, the initially polymerized methyl methacrylate is polymerized completely between two glass sheets at 80° C. over a period of 10 hours. Red, transparent polymethyl methacrylate sheets are obtained.

Example l)

100 parts of polyamide 6 chips obtained by polymerization of ε-caprolactamare intimately mixed with 0.05 part of the dyestuff from Example A) in a mechanical shaker. The powdered chips thus obtained are melted at 260° C. in an extruder, the resulting melt is forced through a single-hole die of 0.5 mm diameter and the filament which emerges is drawn off at a rate of about 25 m/minute. The filament can be stretched four-fold in hot water. A transparently red-dyed filament of excellent fastness to light is obtained. If an opaque dyeing is to be obtained, 0.5 part of titanium dioxide is additionally added.

The residence time in the extruder can be up to 30 minutes without impairment of the colour shade.

EXAMPLE 2

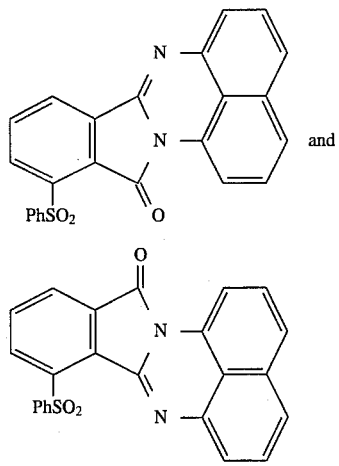

If the procedure is as in the preparation instructions in Example 1, but using 3-benzenesulphonylphthalic acid anhydride instead of the 4-isomer employed there, the above isomer mixture is obtained in a 90% yield; the mixture dyes plastics in orange shades in accordance with the dyeing examples in Example 1B) and produces a high fastness level.

EXAMPLE 3

If mixtures of 3- and 4-benzenesulphonylphthalic acid anhydride are used instead of the isomerically pure benzenesulphonylphthalic acid anhydrides according to Examples 1 and 2, mixtures of the four isomeric dyestuffs as described in Example 1 and 2 are obtained; the mixtures produce red colour shades with good fastnesses when used for dyeing in plastics in accordance with the dyeing examples in Example 1B).

EXAMPLE 4

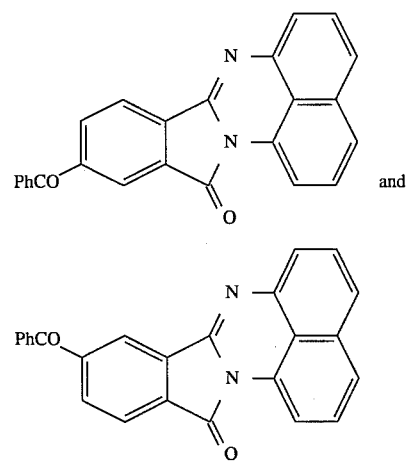

5.9 parts of 1,8-diaminonaphthalene are dissolved in 50 parts of dimethylformamide. After addition of 9.1 parts of 4-benzoylphthalic acid anhydride, the reaction mixture is heated at 140° C. for 1 hour. It is then cooled to about 80° C. and diluted with 60 parts of methanol, the precipitate is filtered off with suction at room temperature and the residue is washed with methanol and water. After drying, 15.2 parts of the above isomer mixture are obtained. When used for dyeing analogously to the dyeing examples in Example 1, the above dyestuff gives yellowish-tinged red dyeings of high fastness.

EXAMPLE 5

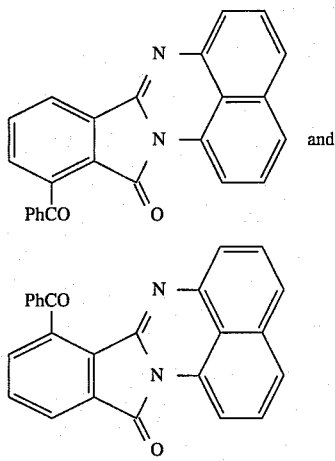

If the 4-benzoylphthalic acid anhydride in Example 4 is replaced by 3-benzoylphthalic acid anhydride and the subsequent procedure is as described therein, a mixture of two isomeric dyestuffs which have the structure shown is obtained. (Yield: 87%)

When used for dyeing in accordance with the dyeing examples in Example 1, the above isomer mixture leads to orange dyeings of high fastness.

EXAMPLE 6

If mixtures of 3- and 4-benzoylphthalic acid anhydride are used instead of the isomerically pure benzoylphthalic acid anhydrides in the preparation instructions of Examples 4 and 5, mixtures of the four isomeric benzoylphthaloperinones described in Examples 4 and 5 are obtained; these mixtures produce yellowish-tinged red colour shades of high fastness when used for dyeing in plastics in accordance with the dyeing examples in Example 1B).

EXAMPLE 7 TO 66

The dyestuffs described in Table 1, which are used for dyeing in plastics in accordance with 1B) a)-1) and produce the colour shades shown in Table 1, are obtained in a manner analogous to that described in Example 1A from the compounds of the formulae IV and V.

| Example | Substituted derivative of phthalic acid (IV) employed | Substituted 1,8-diamino-naphthalene (V) employed | Yield of dyestuff analogous to Example 1A | Colour shade analogous to Example 1B |
|---|---|---|---|---|
| 7 | 4-(4'-methylbenzene-sulphonyl)- | Unsubstituted | 95% | red |
| 8 | 3-(3,-methylbenzene-sulphonyl)- | " | 93% | orange |
| 9 | 4-(2'-methylbenzene-sulphonyl)- | " | 90% | red |
| 10 | 4-(4'-t-butylbenzene-sulphonyl)- | " | 90% | red |
| 11 | 4-(2',4'-dimethylbenzene-sulphonyl)- | " | 92% | red |
| 12 | 4-(4'-chlorobenzene-sulphonyl)- | " | 90% | red |
| 13 | 4-(3'-chlorobenzene-sulphonyl)- | " | 89% | red |
| 14 | 3-(2'-chlorobenzene-sulphonyl)- | " | 96% | orange |
| 15 | 4-(4'-fluorobenzene-sulphonyl)- | " | 85% | red |
| 16 | 4-(4'-bromobenzene-sulphonyl)- | " | 98% | red |
| 17 | 4-(3',4'-dichlorobenzene-sulphonyl)- | " | 99% | red |
| 18 | 4-(4'-methoxybenzene-sulphonyl)- | Unsubstituted | 87% | red |
| 19 | 3-(4'-methoxybenzene-sulphonyl)- | " | 86% | orange |
| 20 | 4-(3'-methoxybenzene-sulphonyl)- | " | 85% | red |
| 21 | 4-(4'-ethoxybenzene-sulphonyll- | " | 84% | red |
| 22 | 4-(3'-butoxybenzene-sulphonyl)- | " | 80% | red |
| 23 | 4-(1-naphthalenesulphonyl)- | " | 99% | red |
| 24 | 4-(methanesulphonyl)- | " | 94% | red |
| 25 | 3-(methanesulphonyl)- | " | 91% | orange |
| 26 | 4-(ethanesulphonyl)- | " | 93% | red |
| 27 | 4-(1-butanesulphonyl)- | " | 83% | red |
| 28 | 4-(cyclohexanesulphonyl)- | " | 88% | red |
| 29 | 4-(acetyl)- | " | 90% | red |
| 30 | 4-(propionyl)- | " | 90% | red |
| 31 | 4-(butyryl)- | " | 85% | red |
| 32 | 4-(Cyclohexanecarbonyl)- | " | 87% | red |
| 33 | 4-(4'-methylbenzayl)- | " | 90% | red |

| Example | Substituted derivative of phthalic acid (IV) employed | Substituted 1,8-diamino-naphthalene (V) employed | Yield of dyestuff analogous to Example 1A | Colour shade analogous to Example 1B |
|---|---|---|---|---|
| 34 | 4-(4'-ethylbenzoyl)- | " | 91% | red |
| 35 | 3-(4'-chlorobenzoyl)- | " | 95% | orange |
| 36 | 4-(3'-chlorobenzoyl)- | " | 95% | red |
| 37 | 4-(2'-chlorobenzoyl)- | " | 93% | red |
| 38 | 4-(2',4'-dichlorobenzoyl)- | " | 98% | red |
| 39 | 4-(2',5'-dichlorobenzoyl)- | " | 97% | red |
| 40 | 3-(3',4'-dichlorobenzoyl)- | " | 98% | orange |
| 41 | 4-(2',6'-dichlorobenzoyl)- | " | 99% | red |
| 42 | 3-(4'-fluorobenzoyl)- | " | 89% | orange |
| 43 | 4-(4'-tert-butylbenzoyl)- | " | 85% | red |
| 44 | 4-(4'-Methoxybenzoyl)- | " | 91% | red |
| 45 | 3-(2'-methoxybenzoyl)- | " | 96% | orange |
| 46 | 4-(3',4'-dimethoxybenzoyl)- | " | 88% | red |
| 47 | 4-(2'-acetoxybenzoyl)- | " | 80% | red |
| 48 | 4-(1-naphthoyl)- | " | 92% | red |
| 49 | 3-(2-naphthoyl)- | " | 90% | orange |
| 50 | 4-(benzenesulphonyl)- | 4-chloro | 96% | yellowish-tinged red |
| 51 | 3-(benzenesulphonyl)- | 2,4-chloro | 96% | yellowish-tinged red |
| 52 | 4-(benzoyl)- | 4-bromo | 98% | yellowish-tinged red |
| 53 | 3-(benzoyl)- | 4-methyl | 89% | orange |
| 54 | 4-(benzenesulphonyl)- | 2,4-dimethyl | 90% | red |
| 55 | 4-(benzoyl)- | 4-methyl-5-chloro- | 92% | yellowish-tinged red |
| 56 | 4-(benzenesulphonyl)- | 4-methoxy | 93% | bluish-tinged red |
| 57 | 4-(benzoyl)- | 2-ethoxy | 85% | bluish-tinged red |
| 58 | 4-(benzenesulphonyl)- | 4,5-dimethylene | 91% | red |
| 59 | 4-(benzenesulphonyl)- | 4,5-trimethylene | 93% | red |
| 60 | 3-(benzenesulphonyl)- | 4,5-dimethylene | 93% | orange |
| 61 | 4-(benzoyl)- | 4,5-dimethylene | 964 | red |
| 62 | 3-(benzoyl)- | 4,5-dimethylene | 90% | orange |
| 63 | 4-(4'-chlorobenzoyl)- | 4,5-dimethylene | 92% | red |
| 64 | 3-(2',4'-dichlorobenzoyl)- | 4,5-dimethylene | 98% | orange |
| 65 | 4-(4'-chlorobenzenesulphonyl) | 4,5-dimethylene | 99% | red |
| 66 | 4-(3',4'-dichlorobenzenesulphonyl)- | 4,5-dimethylene | 98% | red |

EXAMPLE 67

Isoindolo[2,1-α]perimidin-12-one (Solvent Orange 60)

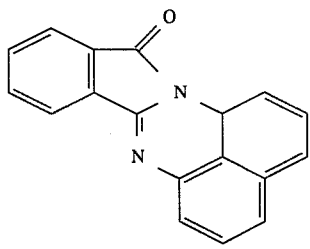

82.5 g of 1,8-diaminonaphthalene are introduced into and dissolved in 350 g of phenol at 80° C. while passing over nitrogen. After the solution has been heated to 90° C., 78.8 g of phthalic acid anhydride are added at 90° to 100° C. in the course of 30 minutes. The temperature is then increased to 130° C. and the mixture is kept at this temperature for 2 hours. It is then cooled to about 80° C. and diluted with 350 ml of methanol, under constant reflux, subsequently stirred for 1 hour and cooled to room temperature and the dyestuff which has precipitated is filtered off with suction. After the dyestuff has been washed with 400 ml of methanol and 2 l of hot water, it is dried at 100° C. 132.2 g of the stated dyestuff are obtained.

If the phenol is replaced by the same amount of p-cresol, 131.3 g of the above dyestuff are obtained.

EXAMPLE 68

8,9,10,11-Tetrachloroisoindolo[2,1-α]perimidin-12-one (Solvent Red 135)

6.0 kg of 1,8-diaminonaphthalene are introduced into 37.0 kg of molten phenol at 80° C., the mixture is heated to 130° and 10.5 kg of tetrachlorophthalic acid anhydride are then added in the course of half an hour, while distilling off the water of reaction, the mixture is kept at 130° for 2 hours and cooled to about 80° C. and 14.0 l of methanol are then added such that the reflux is maintained. After brief subsequent stirring, the mixture is filtered hot and the residue is washed with 20.0 l of methanol and 40 l of hot water and dried at 100° C. 14.2 kg of the stated dyestuff are obtained.

If the procedure is analogous but the precipitating agent methanol is replaced by 12.0 l of hot water, 13.8 kg of the stated dyestuff are obtained in an equally good quality after isolation and washing with 20.0 l of hot water.

EXAMPLE 69

Benz[4,5]isoquino[2,1-α]perimidin-14-one (Solvent Red 179)

250 g of phenol are melted at about 60° C. 47.4 g of 1,8-diaminonaphthalene and 59.4 g of 1,8-naphthalic acid anhydride are introduced, while passing over nitrogen, and the mixture is heated to 150° C. in the course of 1 hour and kept at this temperature for 2 hours. The reaction mixture is cooled to 80° C., 120 ml of methanol are added at a temperature of 80° to 65° C. in the course of 30 minutes, and the mixture is cooled to room temperature and filtered with suction. After the residue has been washed with 240 ml of methanol and dried at 150° C., 88.8 g of the stated dyestuff are obtained in a very good quality.

EXAMPLE 70

Isoindolo[2,1-α]perimidin-12-one (Solvent Orange 60)

281 g of phthalic acid anhydride are introduced into a solution of 300 g of 1,8-diaminonaphthalene in 1150 ml of methanol in the course of 30 minutes, under nitrogen, and the mixture is stirred at room temperature for 1 hour, subsequently heated to 70° C. and kept under reflux for 2 hours. Thereafter, 1250 g of phenol are added to the reaction mixture and the temperature is increased to 130° C., whereupon methanol and water distil off. The mixture is kept at this temperature for 1 hour and cooled to 80° C., and 780 ml of methanol are then allowed to run in such that the reaction mixture remains under reflux. Thereafter, the mixture is cooled to room temperature and filtered with suction, and the residue is washed with 500 ml of methanol and 2000 ml of hot water and dried. 481 g of the stated dyestuff are obtained.

The process variants mentioned in Examples 67 to 70 are also outstandingly suitable for preparation of the dyestuffs described in Examples 1 to 66; if the corresponding free acylphthalic acids are employed instead of the anhydrides, these are initially introduced in phenol and the water is first distilled off at 180° C. in the course of 3 to 5 hours for anhydride formation, the mixture is then cooled to 40°–60° C., the 1,8-diaminonaphthalene is then introduced and the subsequent procedure is as described in Examples 67 to 69.

We claim:
1. A phthaloperinone dyestuff of the formula

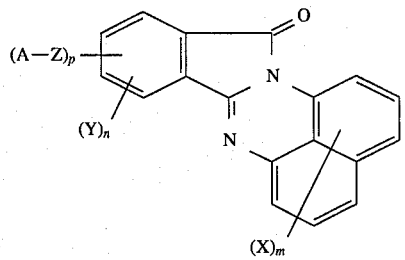

(I)

wherein
Z denotes $SO_2$ or CO,

A is $C_1$–$C_{18}$-alkyl which is unsubstituted or substituted by halogen, $C_1$–$C_4$-alkoxy, phenoxy or phenyl which is unsubstituted or substituted by halogen, $C_1$–$C_4$-alkyl or $C_1$–$C_4$-alkoxy, or represents phenyl or naphthyl, which is unsubstituted or substituted by halogen, $C_1$–$C_4$-alkyl, cyano, $C_1$–$C_4$-alkylmercapto, $C_1$–$C_4$-alkylcarbonylamino, phenyl, phenoxy or $C_1$–$C_4$-alkoxy, X represents $C_1$–$C_6$-alkyl, halogen, $C_1$–$C_6$-alkoxy or $C_1$–$C_7$-acyloxy or represents a cycloaliphatic 5- or 6-membered ring which is fused on in the peri-position, Y represents $C_1$–$C_6$-alkyl, $C_6$–$C_{10}$-aryl, halogen, $C_1$–$C_6$-alkoxy, $C_1$–$C_7$-acyloxy or an amino group which is unsubstituted or substituted by $C_1$–$C_7$-acyl or $C_1$–$C_6$-alkyl, m denotes a number from 0 to 6, n denotes a number from 0 to 3, and p denotes 1 or 2, n+p 1, X can in each case have different or the same abovementioned meanings, and for n>1, Y can in each case have different or the same abovementioned meanings.

2. Phthaloperinone dyestuff according to claim 1, wherein

A is $C_1$–$C_{18}$-alkyl which is unsubstituted or substituted by halogen, $C_1$–$C_4$-alkoxy, phenoxy or phenyl which is unsubstituted or substituted by halogen, $C_1$–$C_4$-alkyl or $C_1$–$C_4$-alkoxy, or represents phenyl or naphthyl, which is unsubstituted or substituted by halogen, $C_1$–$C_4$-alkyl, cyano, $C_1$–$C_4$-alkylmercapto, $C_1$–$C_4$-alkylcarbonylamino, phenyl, phenoxy or $C_1$–$C_4$-alkoxy.

X represents chlorine, bromine, fluorine, $OCH_3$, $OC_2H_5$, $OCH_2(C_6H_5)$, $OC_3H_7$, methyl, ethyl, n-propyl, isopropyl, n-butyl, isobutyl, sec-butyl, tert-butyl or a cycloaliphatic 5- or 6-membered ring which is fused on in the peri-position, Y represents fluorine, chlorine, bromine, $OCH_3$, $NHCOCH_3$, $N(C_2H_5)_2$, methyl, ethyl, n-propyl, isopropyl, n-butyl, isobutyl, sec-butyl or tert-butyl or represents an unsubstituted or substituted phenyl, m denotes a number from 0 to 4, n denotes a number from 0 to 2, p denotes 1 or 2 and n+p denotes a number from 1 to 3.

3. Phthaloperinone dyestuff according to claim 1, wherein

X denotes chlorine, bromine, methyl, ethyl or a cycloaliphatio 5- or 6-membered ring fused on in the peri-position, m denotes a number from 0 to 2, n denotes the number 0 and p denotes 1 or 2.

4. Phthaloperinone dyestuff according to claim 1, in which m represents 0 and p represents 1.

5. Phthaloperinone dyestuff according to claim 1 of the formulae

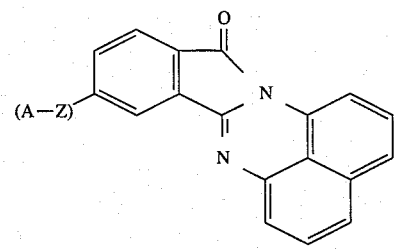

(IIa)

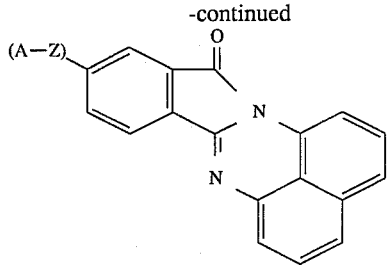 (IIb)
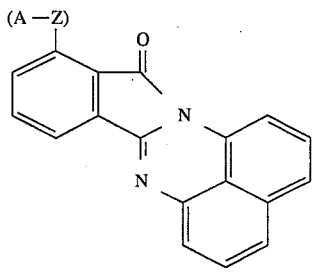 (IIIb)
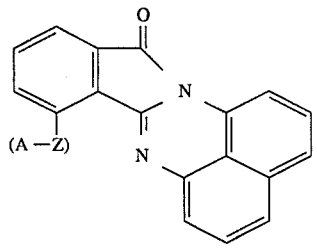 (IIIa)
or mixtures thereof.
* * * * *

UNITED STATES PATENT AND TRADEMARK OFFICE
CERTIFICATE OF CORRECTION

PATENT NO. : 5,530,130
DATED : June 25, 1996
INVENTOR(S) : Roschger, et al.

It is certified that error appears in the above-indentified patent and that said Letters Patent is hereby corrected as shown below:

Col. 20, line 46  Delete " cycloaliphatio " and substitute -- cycloaliphatic --

Signed and Sealed this

Twenty-fourth Day of December, 1996

Attest:

BRUCE LEHMAN

*Attesting Officer*     *Commissioner of Patents and Trademarks*